E. SCHULER.
STAGE AND LADDER.
APPLICATION FILED FEB. 3, 1921.
1,432,040. Patented Oct. 17, 1922.
5 SHEETS—SHEET 1.
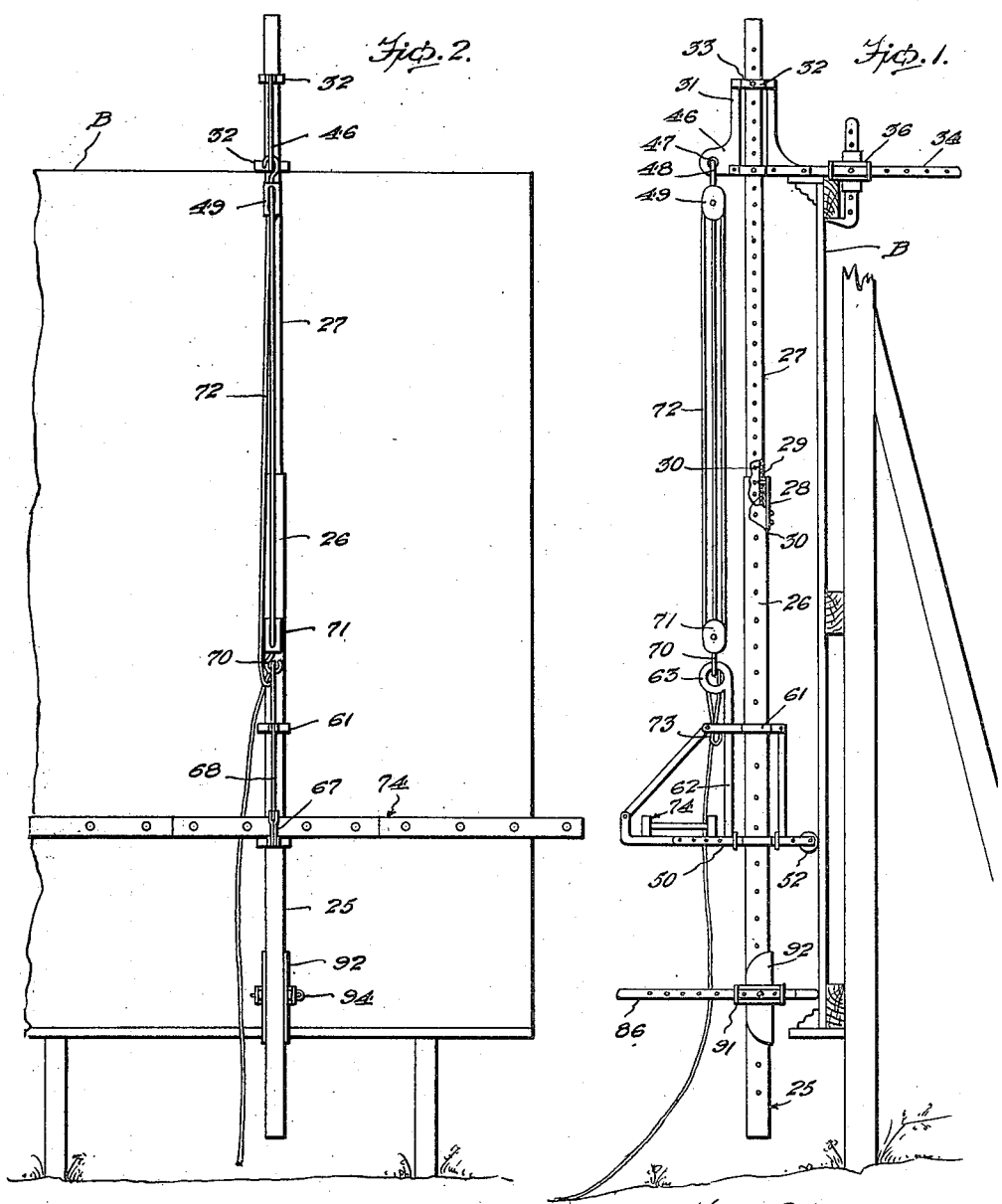
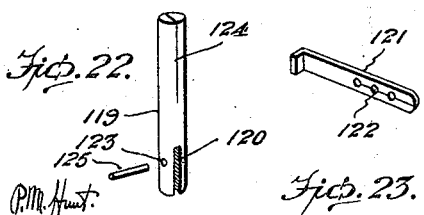
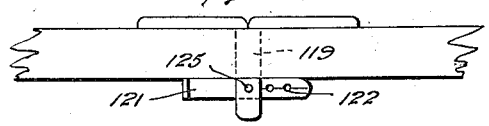
E. Schuler INVENTOR

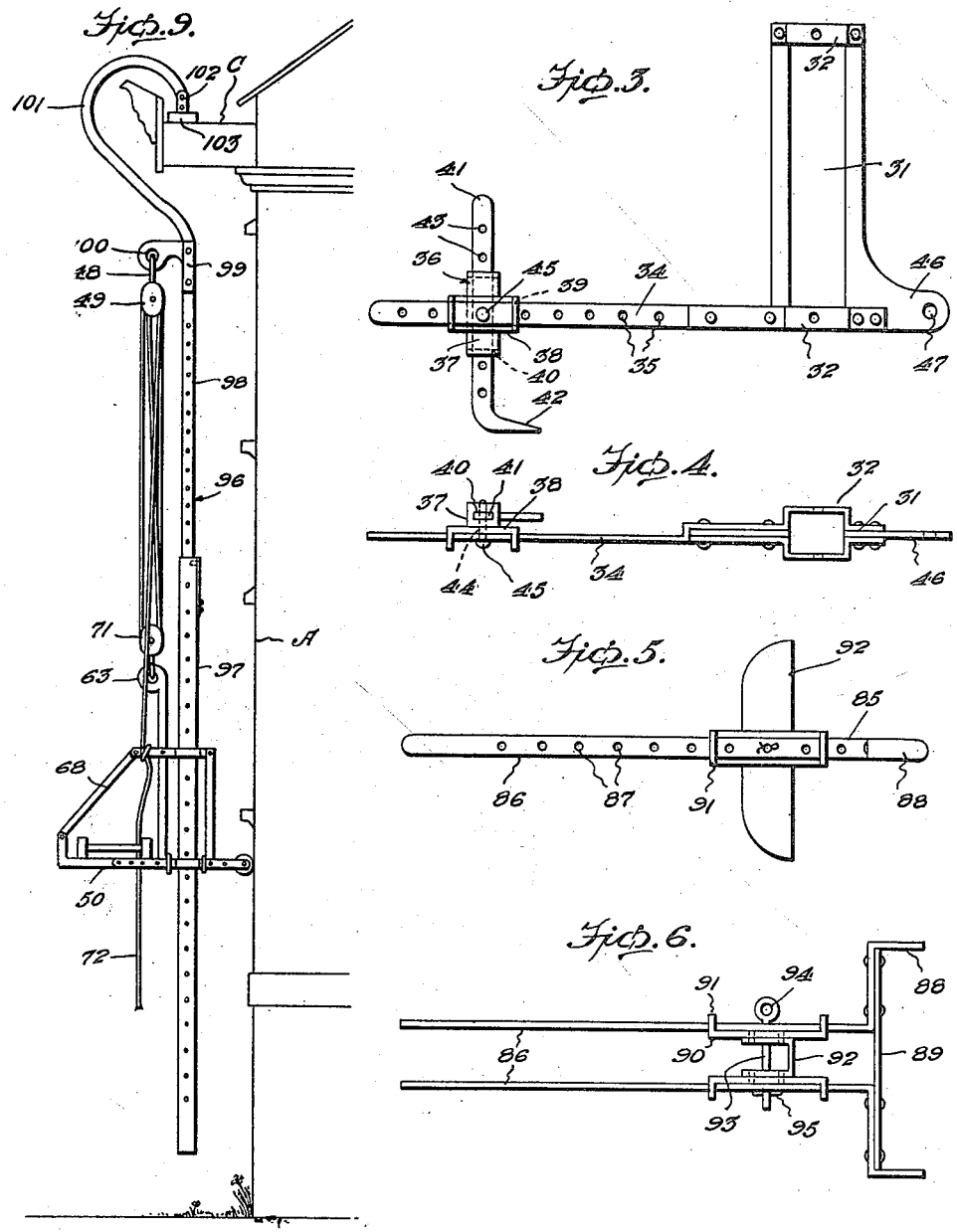

E. SCHULER.
STAGE AND LADDER.
APPLICATION FILED FEB. 3, 1921.
1,432,040.
Patented Oct. 17, 1922.
5 SHEETS—SHEET 3.
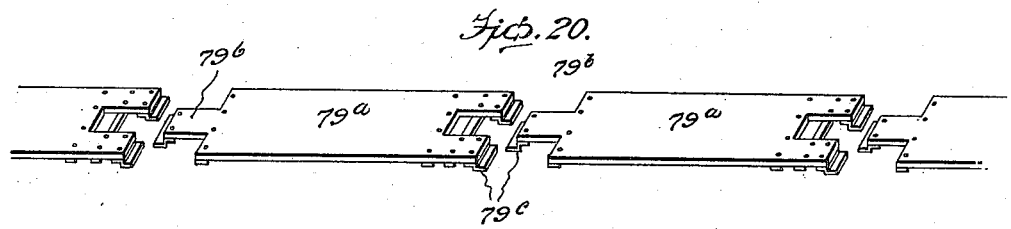
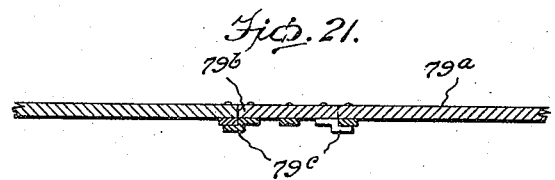
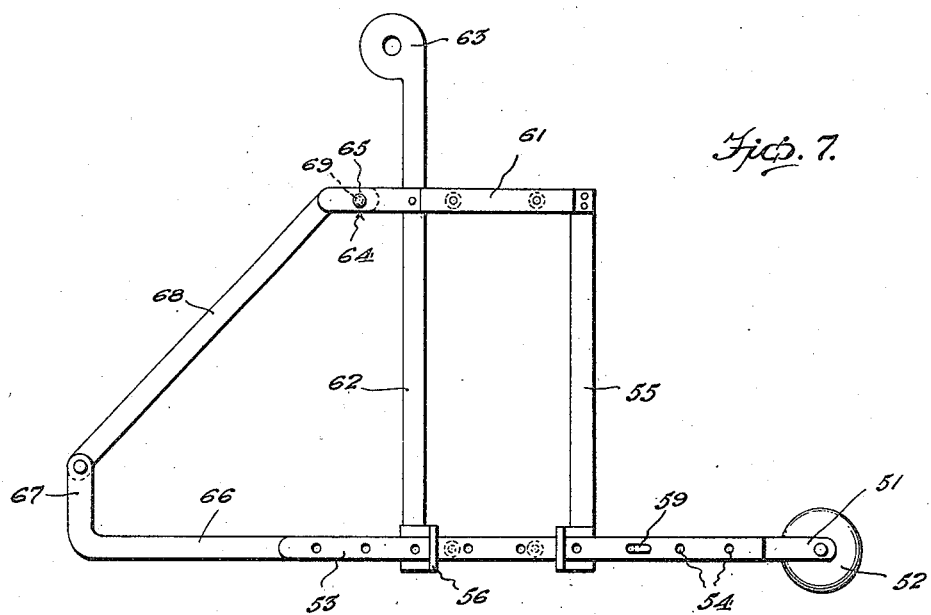
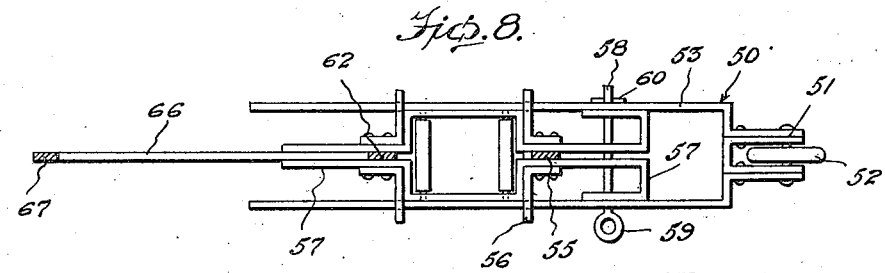
E. Schuler INVENTOR
BY Victor J. Evans ATTORNEY

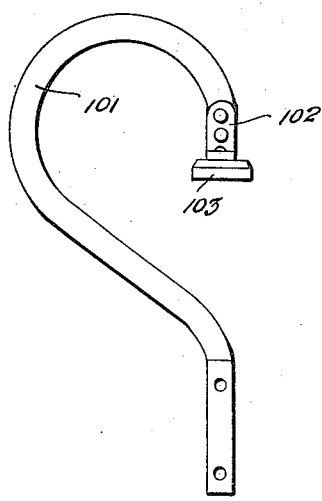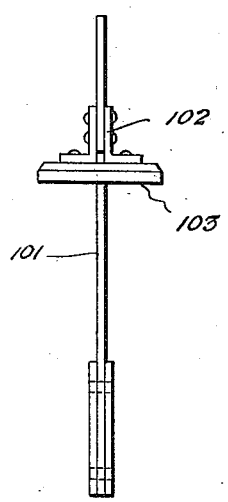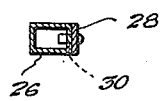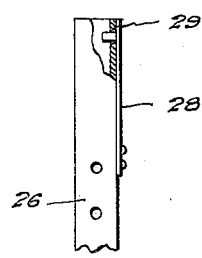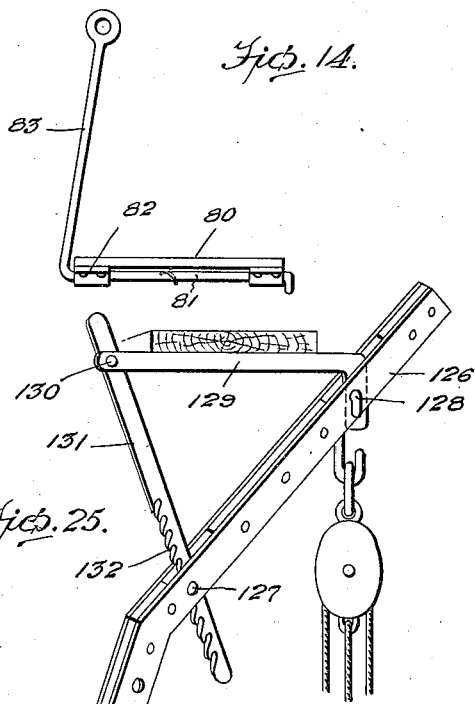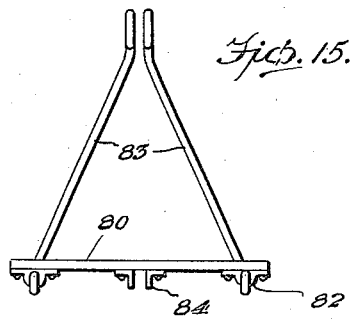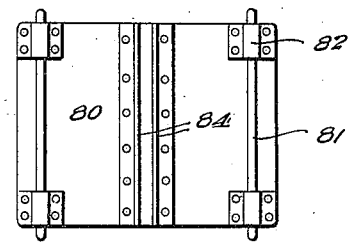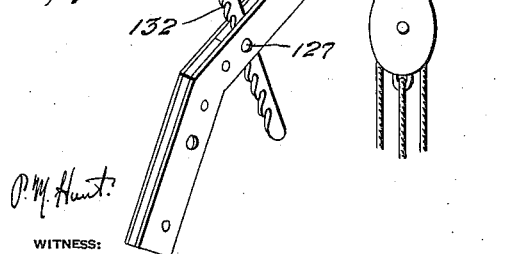

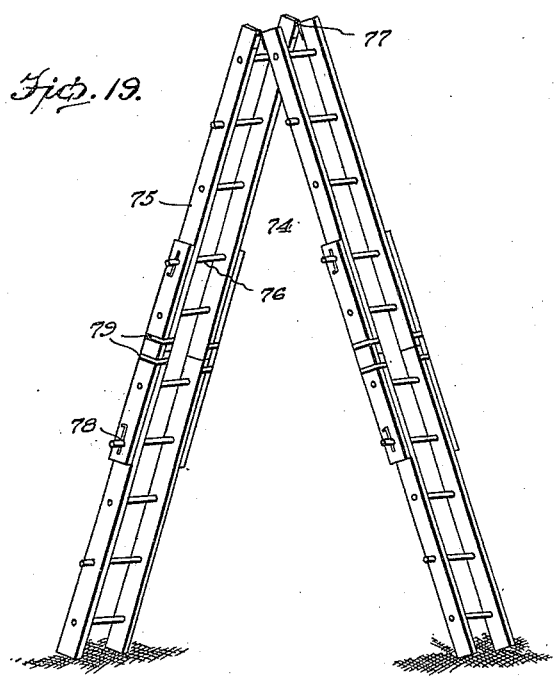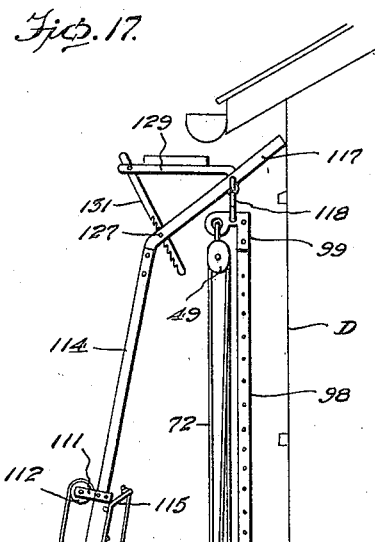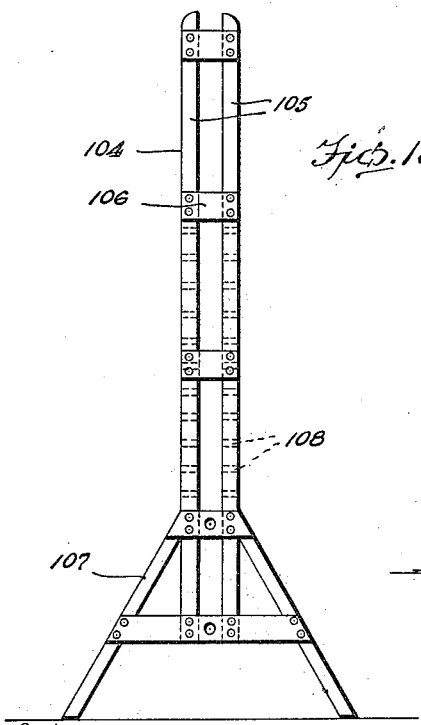

Patented Oct. 17, 1922.

1,432,040

UNITED STATES PATENT OFFICE.

EDWARD SCHULER, OF SPRINGFIELD, ILLINOIS.

STAGE AND LADDER.

Application filed February 3, 1921. Serial No. 442,211.

*To all whom it may concern:*

Be it known that I, EDWARD SCHULER, a citizen of the United States, residing at Springfield, in the county of Sangamon and State of Illinois, have invented new and useful Improvements in Stages and Ladders, of which the following is a specification.

This invention relates to scaffold devices used by workmen in working upon buildings, and has for its object the provision of a combined device adapted for use as a swinging stage, sectional step ladder, sectional platform, and ladder jacks, the particular advantage of the device being that it can be placed in position ready for workmen to use it without any necessity of climbing to the top of the house to place the hooks for supporting the device, the entire device being placed in position directly from the ground.

An important object is the provision of a device of this character which is so constructed that no part touches the house or bulletin board at the area to be painted, there being furthermore no parts sufficiently close to the surface to be painted to cause any interference whatever with convenient operations.

Another object is the provision of a device of this character which is so constructed that it may be readily taken apart and packed into compact form so as to occupy but little space in transportation or storage.

Another object is the provision of a device of this character which is so constructed that the platform portion may be a ladder which, when detached may be used by itself, the ladder being hinged at its middle whereby one portion will form a brace for the other.

An additional object is the provision of a device of this character which will be comparatively simple, easy to use and adjust, a great time and labor saver, efficient and durable in service, and a general improvement in the art.

With the above and other objects and advantages in view, the invention consists in the details of construction to be hereinafter more fully described and claimed and illustrated in the accompanying drawings in which—

Figure 1 is a side elevation of my device showing one form thereof,

Figure 2 is a front elevation,

Figure 3 is an enlarged side elevation of the upper portion engaging the bulletin board, Figure 4 is a plan view of this upper portion, Figure 5 is an enlarged side elevation of the steadying member, Figure 6 is a plan view thereof, Figure 7 is an enlarged side elevation of the ladder supporting bracket, Figure 8 is a horizontal sectional view therethrough, Figure 9 is a side elevation of a modified form, Figures 10 and 11 are enlarged detail views of the cornice hook, Figures 12 and 13 are detail sectional views of the upright guide members, Figure 14 is a detail view showing a one man platform associated with the ladder bracket, Figure 15 is an end view thereof, Figure 16 is a bottom plan view thereof, Figure 17 is a side elevation of another modified form, Figure 18 is a front elevation of the extensible support.

Figure 19 is a side elevation of the scaffold detached and used as a ladder,

Figure 20 is a perspective view of the sectional stage plank diassembled,

Figure 21 is a longitudinal section therethrough,

Figures 22 and 23 are detail views of a locking pin,

Figure 24 is a view showing the locking pin in use, and

Figure 25 is a view of a special bracket.

Referring more particularly to the drawings, the letter A designates a side of a house or other structure, and B designates the bulletin board. In carrying out my invention I provide a pair of spaced uprights designated broadly by the numeral 25 and each is formed of a pair of telescopic sections 26 and 27 rectangular in cross section and held together by a latch member 29 engaging through registering ones of a plurality of holes 29 and 30 in the sections 26 and 27, respectively. These two upright members may be spaced any desired distance apart, depending upon the length of stage to be used, as will be hereinafter explained.

Adjustably mounted upon the upper end of each section 27 is a bracket structure including a main body 31 grooved for engagement upon the section 27 and provided with angular strips or brackets 32 embracing the section and held thereon by means of suitable pins 33 passing through holes in the brackets 32 and body 31 and through selected ones of the holes 30. Carried by each bracket body 31 is an outwardly extending arm 34 provided with a series of holes 35 and slidable upon each arm 34 is a carriage 36 including crossed arms 37 and 38 secured together with their end portions laterally offset, as shown, and slotted, as indicated at 39 and 40, respectively. The slots 40 are engaged upon the arm 34. Slidable through the slots 39 of the arm 37 is a vertically extending bar 41 having its lower end formed with a hook 42 and provided throughout its length with a series of holes 43. At their juncture the arms 37 and 38 are formed with a hole 44 which is adapted to register with any one of the holes 35 and with which may be registered any one of the holes 43, and a pin 45 is passed through these registering holes for holding the bar 41 and carriage 36 in fixed relation to each other and to the arm 34. At the side of the bracket 31 opposite that from which the arm 34 extends is an extension 46 having a hole 47 within which is engaged a hook or eye 48 carried by a pulley block 49.

Associated with each of the upright members 25 is a stage support which includes a U-shaped horizontally disposed member 50 provided at its bight portion with a fork 51 within which is journaled a roller 52 and having each of its arms 53 provided with a series of holes 54. The numeral 55 designates an upright disposed between the arms 53 and having secured to its lower end right angular brackets 56 slotted for slidable engagement with the arms 53. Secured upon the sides of the upright 55 and interposed between it and the brackets 56 are reflexly bent brackets 57 provided with holes adapted to register with selected ones of the holes 54 and passing through these registering holes is a pin 58 having a ring head 59 and provided at its opposite end with a cotter pin or the like 60 for preventing its withdrawal. Connected with the upper ends of the uprights 55 are horizontal bars 61 which are secured to an upright 62 which extends above the upright 55 and which has its upper end formed with an eye 63. The end portions of the bars 61 are brought together and secured and are formed with holes 64. Secured upon the lower end of the upright 62 are right angle brackets 56 slotted for slidable engagement upon the arms 53 and secured to these angle brackets between them and the upright 62 are the other ends of the brackets 57, these brackets 57 being offset laterally intermediate their ends whereby to form a rectangular guide slidable upon the upright 25. The bars 61 are similarly shaped to form identically the same kind of a guide likewise slidable upon the upright 25. Secured between these second mentioned ends of the brackets 57 is a bar 66 which has its free end upturned, as shown at 67 and pivotally connected with a brace bar 68 which has its upper end detachably connected with the bars 61 by means of a pin 65 passing through the hole 64 and through a hole 69 in the bar 68. Connected with the eye 63 is a hook or eye 70 carried by a pulley block 71. The numeral 72 designates a cable or rope which is secured at one end to the block 71 and which has its intermediate portion wound back and forth over the pulleys in the blocks 49 and 71, any suitable hook 73 or the like being provided on the stage brackets for holding the rope.

The slidable bracket members just described are for the purpose of supporting a platform or stage upon which the workman may sit or stand while engaged in working upon a building. It is easily conceivable that this platform might be merely a long plank, though as a matter of fact I prefer to use the ladder structure shown in Figure 19. This ladder structure comprises a plurality of sections 74 including sides 75 and rungs 76. Two of the sections are hingedly connected, as shown at 77, and the other sections are slidably engageable upon these sections by having the ends of their sides slotted, as shown at 78, for engagement upon projecting ends of certain rungs and which furthermore have straps or bands 79 encircling the sides. As shown in Figure 19, the ladder when removed from the slidable brackets may be set up and used as a step ladder. If desired, I may form the stage or platform as a plurality of boards 79$^a$ detachably connected by means of interfitting tongues 79$^b$ and angular brackets 79$^c$, as shown in Figures 20 and 21.

If preferred, instead of using a plank on the ladder in association with two upright members 25 and two slidable supports thereon, I may make use of a single upright support carrying the bracket structure which engages the bulletin board, and exactly the same as the structure above described in other respects. This arrangement is shown in Figures 14, 15 and 16. In this form of the invention I may make use of a platform 80 supported upon the bar 66 and provided at opposite edges with rods 81 passing through suitable brackets 82 and then extended upwardly to form converging arms 83 which have their upper ends connected with the sliding bracket structure at the bar 61 by means of the pin 65. This form of the device is designed for use by one workman only who of course sits upon the platform 80. It might be stated that the underside of the platform 80 carries angle irons 84 which engage against opposite sides of the bar 66 to prevent lateral displacement of the platform.

Associated with the lower end of each upright member 25 is a steadying member designated broadly by the numeral 85, Figures 5 and 6. This member comprises a pair of spaced bars 86 which are each provided with a plurality of holes 87 and having their end portions laterally and then right angularly offset, as shown at 88, for engagement against the sides of the building. The bars 86 are held in proper spaced relation by a bar 89 which is secured to the offset end portions, as clearly shown in Figure 6. Associated with the bars 86 are brackets 90 having right angularly bent ends 91 slotted for slidable engagement upon the bars 86, and these brackets are each formed with a hole adapted to register with selected ones of the holes 87. Disposed inwardly of the brackets 90 is a U-shaped bracket 92 secured thereto and likewise having its arms formed with holes. This U-shaped member 92 is relatively long and is adapted to slidably engage against the upright 25. A pin 93 is employed for passing through the registering holes for holding this steadying member in proper adjusted position upon the upright 25 and this pin is provided at one end with a ring head 94 and at its other end with a cotter pin or the like 95 whereby to prevent accidental withdrawal.

The parts being constructed and assembled as above described it is apparent that it is used in exactly the same manner as in ordinary swinging stages such as is used by painters and other mechanics. By virtue of the provision of the block and tackle and the slidable mounting of the stage supporting brackets it will be apparent that the workmen may move the stage and its supporting brackets up or down as may be required from time to time to enable them to work upon the wall surface of the building. It is also to be observed that the device is placed in position from the ground only, it being entirely unnecessary to climb upon the roof or to make use of ladders in engaging the bulletin board hooks in position.

In Figure 9 I have shown a somewhat modified form of the device. In this form each upright 96 is formed of a lower section 97 identically the same as the section 26, and an upper section 98 slidably adjustably connected therewith. The stage supporting bracket is identically the same as in the previously described form and the lowermost steadying member including the bar 86 and its associated parts may be used or not as preferred. This form of the device is, however, different inasmuch as I dispense entirely with the bracket structure 31 carrying the bulletin board engaging hook 42. In place of these parts I provide a bracket 99 upon the upper end of the section 98 and this bracket 99 has a hole 100 within which is engaged the hook or eye 48 of the upper pulley block 49 for supporting the stage holding bracket. Secured to this bracket 99 is a cornice hook 101 upon the end of which are secured angle brackets 102 carrying a bearing block 103 adapted for engagement within the gutter C at the edge of a roof. The operation of this form of the device is identically the same as that of the previously described form.

Referring to Figures 17 and 18 it will be seen that I have provided another modification. In this form I make use of the structure shown in Figure 9 except that the cornice hook 101 is dispensed with. This form is designed for use in connection with buildings which have no bulletin board such as is shown in the first described form and no gutter structure such as is shown in Figure 9. It therefore becomes necessary in this event to provide other means for supporting the upper end of the uprights. In carrying out this form I make use of a brace device which comprises a base portion designated broadly by the numeral 104 and including spaced bars 105 connected at intervals by cross plates 106 and having secured to their lower ends diverging legs 107. The side bars 105 are each provided with a series of holes 108. Slidable between the bars 105 of this base member is a bar 109 held in adjusted position by means of a pin 110 which passes through selected ones of the holes 108 and through a hole in the bar 109. At the upper end of the bar 109, which is formed hollow, is secured a bracket 111 carrying a pulley 112 from which is trained a flexible member 113 which extends down to the ground and which has its other end connected with the lower end of a bar 114 slidable within the bar 109 and the purpose of the flexible member 113 is to pull the bar 114 upwardly out of the bar 109 and to hold it in such adjusted position. Also connected with the bar 109 is a bracket 115 with which is connected one end of a rope or the like 116 which may be pulled upon to lower the bar 109 between the bars 105. Secured upon the upper end of the bar 114 is an inclined bar 117 adapted to be engaged against the side wall D of a building. Depending from this bar 117 is a hook 118 which engages the bracket 99 at the top of the upright section 98. In this form of the device it will be seen that the operation is identically the same as that of the previously described forms, the only difference being the different means for supporting the upper ends of the uprights.

Referring to Figures 22 and 23, it will be seen that I have provided a novel securing member for fastening various parts of the device together. This securing member is formed as an elongated body of metal 119 which has one end bifurcated, as shown at 120, for the reception of a locking plate 121 having a plurality of holes 122 adapted to register selectively with a hole 123 formed in the bifurcated end of the body 119. The other end of the body 119 is split, as shown at 124, and the material is such that it may be bent comparatively easily so that when the device is inserted through an element the material at opposite sides of the split may be bent into opposite directions or into circular or other form to define a retaining head. The locking plate 121 is inserted through the bifurcation and held by means of a transverse pin 125. This securing means will be found advantageous for use in various capacities as will readily suggest itself. The adaptability of this securing means is illustrated well in Figure 24.

In Figure 25 I have shown a special bracket adapted for use in connection with certain of the major portions of the device. In this figure 126 designates the upper end of an inclined supporting bar which might be the upper end of the bar 114 shown in Figure 17, though this bracket to be described is not necessarily to be used in connection with a support like the support shown in Figure 17. Extending from one side of the bar 126, at a point spaced from the upper end thereof, is a pin 127. Pivoted at the upper end of the bar 126, as shown at 128, is a bracket arm 129 which is adapted to serve as a support for the step ladder or for a long plank, as preferred, though it is conceivable that it may be used in other capacities. Pivotally connected with the free end of the arm 129, as shown at 130, is a downwardly inclined bar 131 which is formed in one edge with a series of notches 132, any one of which may be engaged upon the pin 127 for adjusting the arm 129 into horizontal position.

From the foregoing description and a study of the drawings it will be apparent that I have thus provided an extremely efficient structure which is designed for many uses and which is convertible from one adaptation into another very easily, the device being specifically constructed and equipped with sufficient accessory parts to enable it to be associated and held rigid with respect to different types of buildings. Owing to the peculiar construction it will be seen that the device is easy to use and will be unusually convenient, especially as there are no parts engaging against the surface or wall to be worked upon.

While I have shown and described the preferred embodiments of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising an extensible upright support, a bracket vertically adjustably mounted upon the upper end of the support, a hook device detachably connected with and laterally adjustable with respect to said bracket and engaging with an edge of a building at the upper portion thereof, a bracket structure slidable upon the upright, block and tackle connected with said brackets, a platform device carried by said second named bracket, and means engaged with the lower end of the support and engaging the side of the building comprising a pair of bars disposed on opposite sides of the upright, a U-shaped yoke disposed between said bars and partially embracing the upright, said bars having their ends toward the building laterally offset, and being adjustable laterally with respect to the support whereby the latter may be maintained vertical at different distances from the building.

2. A device of the character described comprising an upright support, a bracket vertically adjustably mounted upon the upper end of the support and including a horizontal arm, a carriage adjustably mounted upon said arm, a vertically extending hook member slidably adjustably carried by said carriage and engageable with a bulletin board of a building, a bracket structure slidable upon the upright, and block and tackle connected with said brackets, said last named bracket being adapted to support a platform.

3. A device of the character described comprising an upright support, a bracket vertically adjustably mounted upon the upper end of the support and including a horizontal arm, a carriage adjustably mounted upon said arm, a vertically extending hook member slidably adjustably carried by said carriage and engageable with a bulletin board of a building, a bracket structure slidable upon the upright, block and tackle connected with said brackets, said last named bracket being adapted to support a platform, and a bracket member adjustably connected with the lower end of the upright and engaging against the wall of the building, the adjustability of said arm and said last named bracket permitting the disposition of the upright at different distance from the building.

4. A device of the character described comprising an upright support, a stage structure slidable therealong, means for steadying the lower end of the upright, and means for suspending the upright from a building comprising a bracket vertically adjustably mounted upon the upper end of the support, an arm extended from said bracket toward the building, a carriage slidably mounted upon said arm, and a vertically adjustable hook member carried by said carriage and engageable with a bulletin board of the building.

5. A device of the character described comprising a vertically disposed extensible support, means carried by the upper end of the support and adjustable thereon for engagement with the side of a building for holding the support in suspended relation thereto, guide means carried by the lower portion of the support and engageable with the building, block and tackle carried by said first named means, a carriage slidable vertically along the support and connected with said block and tackle, horizontally disposed adjustable arms forming part of said carriage, inclined braces connected with the free end said horizontal arms and with a fixed portion of the carriage, said extensible arm being adapted to support the stage or ladder, and guide rollers carried by the other end of said extensible horizontal arms and adapted to bear against the side of the building.

6. A device of the character described comprising an extensible support, means carried by the upper end of said support for suspending the same from the side of a building, a carriage slidable along the support and adapted to support a base or ladder, block and tackle carried by said first named means and connected with said carriage, a carriage member slidably adjustably mounted upon the lower portion of the support, horizontally extending arms adjustably mounted upon said last named carriage and engageable with the side of the building.

In testimony whereof I, affix my signature.

EDWARD SCHULER.